United States Patent [19]
Yuyama

[11] Patent Number: 4,697,434
[45] Date of Patent: Oct. 6, 1987

[54] PRIME MOVER DRIVEN AIR-CONDITIONING AND HOT-WATER SUPPLYING SYSTEM

[75] Inventor: Hiroshi Yuyama, Shizuoka, Japan

[73] Assignee: Mitsubishi Denki Kabushiki Kaisha, Tokyo, Japan

[21] Appl. No.: 919,476

[22] Filed: Oct. 16, 1986

[30] Foreign Application Priority Data

Oct. 17, 1985 [JP] Japan ................... 60-231819
Feb. 7, 1986 [JP] Japan ................... 61-25431

[51] Int. Cl.$^4$ ................................. F25B 27/00
[52] U.S. Cl. ........................ 62/238.7; 62/323.1; 237/2 B
[58] Field of Search ............ 62/238.6, 238.7, 79, 62/323.1; 237/2 B

[56] References Cited

U.S. PATENT DOCUMENTS 4,614,090 9/1986 Kaneko et al. ............... 62/238.6

FOREIGN PATENT DOCUMENTS 0161437 10/1982 Japan ................... 62/238.7
0161438 10/1982 Japan ................... 62/238.7
0164240 10/1982 Japan ................... 62/238.7

Primary Examiner—William E. Wayner
Attorney, Agent, or Firm—Leydig, Voit & Mayer

[57] ABSTRACT

An air-conditioning and hot-water supplying system has a dual function water-heating heat exchanger; a heat pump circuit circulates a heat-transmitting medium for air conditioning the interior of a housing. The heat pump circuit includes a compressor driven by a prime mover. The system also includes a hot-water circulation circuit having a tank for storing hot water and a pump for circulating water to be stored therein. The water-heating heat exchanger comprises three concentric, different length pipes including an outer pipe, a first heat transfer pipe disposed in the outer pipe, and a second heat transfer pipe disposed in the first heat transfer pipe. Hot water from the hot water circulation circuit flows between the outer and the first heat transfer pipes. Cooling water from a prime mover cooling circuit flows between the intermediate first heat transfer pipe and the innermost second heat transfer pipe. The heat-transmitting medium flows through the second heat transfer pipe. Thus, heat is transferred between the prime mover cooling water and the water in the hot-water circulation circuit and also between the prime mover cooling water and the heat-transmitting medium.

16 Claims, 9 Drawing Figures

PRIME MOVER DRIVEN AIR-CONDITIONING AND HOT-WATER SUPPLYING SYSTEM

BACKGROUND OF THE INVENTION

1. Field of the Invention

This invention relates to an air-conditioning and hot-water supplying system having a prime mover adapted to drive a compressor disposed in a heat pump circuit, and more particularly, to such an air-conditioning and hot-water supplying system capable of recovering heat discharged from the prime mover for the utilization thereof as an auxiliary heat source for heating air as well as a heat source for heating water to be stored in a hot-water tank.

2. Description of the Prior Art

In general, there have been known two types of prime mover driven air-conditioning and hot-water supplying systems of the kind described above, one for directly introducing cooling water heated by a prime mover into an indoor radiator installed in a building or housing where the heat is radiated from the radiator so as to heat the air in the housing, and the other for heating cooling medium circulating through a heat pump circuit by means of prime-mover cooling water and utilizing the cooling medium thus heated for heating the interior of a building or housing.

FIG. 9 shows a circuit arrangement of a conventional prime mover driven air-conditioning and hot-water supplying system of the latter type in which a heat-transmitting medium such as a gaseous cooling medium circulating through a heat pump circuit is heated by cooling water for the prime mover. The conventional air-conditioning and hot-water supplying system as illustrated comprises a heat pump circuit 30 for air conditioning, a hot-water circulation circuit 31, a prime mover cooling circuit 32 for water cooling a prime mover 1, and a heat-pump water-heating circuit 34 for heating water in the hot-water circulation 31 under the heat pump operation of the heat pump circuit 30.

The heat pump circuit 30 includes a compressor 3 operably connected through a clutch 2 with the prime mover 1 in the form of a water-cooled engine, a four-way directional control valve 4 connected to the compressor 3, an indoor heat exchanger 5 connected through an electromagnetic change-over valve 15 to the four-way directional control valve 4 and installed inside a housing for exchanging heat between a heat-transmitting medium in the heat pump circuit 30 and air in the housing, an indoor fan 6 attached to the indoor heat exchanger 5, an indoor heat exchanger 7 installed outside the housing for exchanging heat between the heat-transmitting medium in the heat pump circuit 30 and air outside the housing, an outdoor fan 8 attached to the outdoor heat exchanger 7, a receiver 9 connected to the outdoor heat exchanger 7 through a check valve 11 and to the indoor heat exchanger 5 through a check valve 12 and adapted to store condensed heat-transmitting medium circulating through the heat pump circuit 30, a throttling means 10 such as an expansion valve or the like connected to the receiver 9 and to the outdoor heat exchanger 7 through a check valve 13 and to the indoor heat exchanger 5 through a check valve 14, and a pump 26 adapted to be driven to circulate the heat-transmitting medium in the heat pump circuit 30. The compressor 3, the indoor heat exchanger 5, the outdoor heat exchanger 7, the receiver 9, the throttling means 10 and the pump 26 are connected with each other through pipings so that the heat-transmitting medium is forced to circulate through these members for air conditioning the interior of the housing.

The hot-water circulation circuit 31 comprises a hot water tank 19 connected at its lower portion through a water feed pipe 21 to a source of water (not shown) and at its top to the hot water tap 22 for dispensing the hot water stored in the hot water tank 19; and a pump 20 connected at its one side to a lower portion of the hot water tank 19 and at its other side to the top of the hot water tank 19 through heat exchangers 17 and 18 to be described in detail later so that water supplied to the hot water tank 19 from the water source (not shown) through the water feed pipe 21 is forced by means of the pump 20 to circulate through the heat exchangers 17, 18 and the hot water tank 19 while being heated by the heat exchangers 17, 18.

The heat-pump water-heating circuit 34 comprises the heat exchanger 17 connected to the four-way directional control valve 4 in the heat pump circuit 30 through an electromagnetic change-over valve 16 and to the receiver 9 through a check valve 12 in the heat pump circuit 30 for exchanging heat between the heat-transmitting medium and water in the hot-water circulation circuit 31.

The prime mover cooling circuit 32 comprises a pump 23, a water jacket (not shown) in the prime mover 1 connected to the pump 23, and the heat exchanger 18 connected to the pump 23 and to the water jacket (not shown) in the prime mover 1 through an electromagnetic change-over valve 24, the heat exchanger 18 being also connected to the heat exchanger 17 and the hot water tank 19 in the hot-water circulation circuit 31 for exchanging heat between the cooling water in the prime mover cooling circuit 32 and the water in the hot-water circulation circuit 31. A sensor 35 is arranged between the heat exchanger 18 and the electromagnetic change-over valve 24 for sensing the temperature of the cooling water circulating through the prime mover cooling circuit 32.

The heat-transmitting-medium heating circuit 33 is connected with the prime mover cooling circuit 32 in a parallel relation with the heat exchanger 18 and comprises a heat exchanger 27 connected to the pump 23 and to the water jacket in the prime mover 1 through an electromagnetic change-over valve 25, the heat exchanger 27 being also connected at its one side to the receiver 9 through a pump 26 and at its other side to the heat pump circuit 30 through a check valve 28 at a location between the four-way directional control valve 4 and the electromagnetic change-over valves 15 and 16 for heating the heat-transmitting medium circulating through the heat pump circuit 30 by means of the prime mover cooling water heated by the prime mover 1.

In operation, by changing over the four-way directional control valve 4 in an appropriate manner, the conventional air-conditioning and hot-water supplying system is changed between a cooling operation mode and a heating operation mode. When the system is changed to a cooling operation mode, heat-transmitting medium is discharged from the compressor 3 driven by the engine 1 to flow through the four-way directional control valve 4, the check valve 11, the receiver 9, the expansion valve 10, the check valve 14, the indoor heat exchanger 5, the electromagnetic change-over valve 16 and the four-way directional control valve 4, thus returning to the compressor 3. In the course of circulation of the heat-transmitting medium through the heat pump circuit 30, heat of the heat transmitting medium is radiated to the outside by means of the outdoor heat exchanger 7 so that the heat transmitting medium is thereby cooled, whereas the heat-transmitting medium thus cooled absorbs heat from the air in the interior of the housing under the action of the indoor heat exchanger 5, thus cooling the air in the housing.

On the other hand, where the air-conditioning and hot-water supplying system is changed over to a heating mode, the heat-transmitting medium discharged from the compressor 3 flows through the four-way directional control valve 4, the electrpmagnetic change-over valve 15, the indoor heat compressor 5, the check valve 12, the receiver 9, the expansion valve 10, the check valve 13 and the outdoor heat exchanger 7 and the four-way directional contromˌ valve 4, returning to the compressor 3. During such circulation of the heat-transmitting medium through the heat pump circuit 30, the heat-transmitting medium of a low temperature absorbs heat from the outside air under the heat-exchanging action of the outdoor heat exchanger 7, and the heat thus absorbed by the heat-transmitting medium is then radiated to the air inside the housing under the action of the indoor heat exchanger 7, thereby heating the interior of the housing.

When the electromagnetic change-over valve 15 in the heat pump circuit 30 is closed and the electromagnetic change-over valve 16 is opened in the heating operation mode of the system, the heat-transmitting medium discharged from the compressor 2 through the four-way directional control valve 4 flows through the electromagnetic change-over valve 16 and the heat exchanger 17 in the heat-pump water-heating circuit 34, and thence through the check valve 12, the receiver 9, the expansion valve 10, the check valve 13, the outdoor heat exchanger 7 and the four-way directional control valve 4 into the compressor 3 so that water, being fed to the tank 19 from a source of water (not shown) via the water feed pipe 21 and forced by the pump 20 to circulate through the heat exchangers 17, 18, is heated by the heat-transmitting medium flowing through the heat-pump water-heating circuit 34 under the action of the heat exchanger 17.

In this case, in the cooling or heating operation mode of the system, the prime mover 1, being operated to drive the compressor 3, must be cooled. Specifically, by driving the cooling water pump 23, cooling water is forced to circulate through the prime mover cooling circuit 32, that is the cooling water discharged from the pump 23 flows successively through the water jacket (not shown) in the prime mover 1, the electromagnetic change-over valve 24 and the heat exchanger 18 and returns to the pump 23. Thus, in the course of circulation of the cooling water through the prime mover cooling circuit 32, the cooling water passing through the water jacket in the prime mover 1 absorbs the heat generated in the prime mover 1 and cools it. On the other hand, the cooling water thus heated by the prime mover 1 passes through the heat exchanger 18 so that it heats water circulating through the hot-water circulation circuit 31 under the action of the heat exchanger 18. Accordingly, in this case, water circulating through the hot-water circulation circuit 31 is heated by utilizing heat generated in the prime mover 1 which otherwise would be wasted (hereinafter referred to as waste heat).

Hot water to be stored in the hot water tank 19 successively circulates from the hot water tank 19 through the hot-water circulation pump 20, the heat exchanger 17, the heat exchanger 18 and back to the tank 190. Since the electromagnetic change-over valve 16 is closed during the cooling or heating operation mode of the system, the water circulating through the hot-water circulation circuit 31 is heated only by the heat exchanger 18. On the other hand, in the heat-pump hot-water supplying operation of the system, the electromagnetic change-over valve 15 in the heat pump circuit 30 is closed and the electromagnetic change-over valve 16 is opened so that water circulating through the hot-water circulation circuit 31 is heated by both of the heat exchangers 17 and 18. In this regard, during the operation of the prime mover 1, the hot-water circulation pump 20 is always driven to run so as to utilize the waste heat generated in the prime mover 1.

Although the normal cooling or heating operation of the system is effected in the above-described manner, cooling water in the prime mover cooling circuit 32 is introduced into the heat-transmitting-medium heating circuit 33 by opening the electromagnetic change-over valve 25 and closing the electromagnetic change-over valve 24 so that the cooling water discharged from the cooling water pump 23 flows through the water jacket in the prime mover 1 and the electromagnetic change-over valve 25 into the heat exchanger 27, and returns to the cooling water pump 23 in cases where the heating load is great during the heating operation of the system or where the hot water stored in the hot water tank 19 has been heated to a high temperature and at the same time, the cooling water passing through the water jacket of the prime mover 1 is raised in its temperature so that the heat absorbed by the cooling water from the prime mover 1 can not be radiated from the heat exchanger 18 to any satisfactory extent. Simultaneous with this change-over operation of the electromagnetic valves 24 and 25, the pump 26 is actuated to run so that the heat-transmitting medium cooled by the indoor heat exchanger 5 is introduced from the receiver 9 into the pump 26 which in turn discharges the cooled heat-transmitting medium toward the heat exchanger 27. The heat-transmitting medium thus discharged from the pump 26 passes through the heat exchanger 27 and absorbs the heat from the prime mover cooling water passing therethrough so that it is thereby heated up and at the same time cools the cooling water. In this manner, the temperature of the cooling water is lowered by the heat exchanger 27. The heat-transmitting medium thus heated by the heat exchanger 27 passes through the check valve 28 and merges with the heat-transmitting medium discharged from the compressor 3 through the four-way directional control valve 4 so that the heat transmitting medium thus merged flows through the electromagnetic change-over valve 15 into the indoor heat exchanger 5 where the heat of the heat transmitting medium is radiated to heat the air in the housing. Thus, an increased heating capacity is obtained at the indoor heat exchanger 5. As a result, in spite of the fact that in the normal heating operation under the heat-pump operation mode of the system, the heating capacity is reduced when the temperature of the outside air is low, such a reduction in heating capacity is effectively compensated for by utilizing the waste heat generated in the prime mover 1 to heat the heat-transmitting medium supplied to the indoor heat exchanger 5 as referred to above, the amount of such waste heat of the prime mover 1 being constant irrespective of the ouside temperature.

In the event that the temperature of the hot water stored in the hot water tank 19 rises to such an extent that the cooling water for cooling the prime mover 1 can not be cooled by the water circulating through the hot-water circulation circuit, the sensor 35 detects such a high temperature of the cooling water so that the electromagnetic change-over valves 24 and 25 are closed and opened, respectively, to circulate the cooling water through the heat exchanger 27 in place of the heat exchanger 18.

With a conventional air-conditioning and hot-water supplying system as constructed above, however, the heat exchanger 27 for exchanging heat between the cooling water for cooling the prime mover 1 and the heat-transmitting medium circulating through the heat pump circuit 30, and the heat exchanger 18 for exchanging heat between the water in the hot-water circulation circuit 31 and the cooling water in the prime mover cooling circuit 32 are incorporated in or connected to the prime mover cooling circuit 32 in a parallel relation with each other such that in the normal heating or cooling operation of the system, the electromagnetic change-over valves 24 and 25 are opened and closed, respectively, whereas when a greater heating capacity is required, the electromagnetic change-over valves 24 and 25 are closed and opened, respectively, so as to introduce the cooling water for cooling the prime mover 1 into the heat exchanger 27 so as to heat the heat-transmitting medium fed into the indoor heat exchanger 5. In order to achieve such a function, provision is needed for the electromagnetic change-over valves 24 and 25 and the sensor 35 as well as piping arrangements and installation spaces for the heat exchangers 18 and 27, thus resulting in an increase in the overall dimensions and weight of the entire air-conditioning and hot-water supplying system.

In particular, the above-described conventional air-conditioning and hot-water supplying system having a compressor driven by a prime mover is superior in running cost to an air-conditioning and hot-water supplying system driven by an electric motor, but disadvantageous in the weight and required installation space thereof since the prime mover and the related auxiliary equipment are needed and hence the weight and required installation space become larger as compared with those for an air-conditioning and hot-water supplying system driven by an electric motor. In addition, to heat the heat-transmitting medium by the use of the waste heat generated in the prime mover for improved heating capacity results in an increase in number of heat exchangers as well as an increase in the weight and manufacturing cost of the entire system.

SUMMARY OF THE INVENTION

In view of the above, the present invention is intended to obviate the above-described problems of the prior art and has for its object the provision of a novel and improved air-conditioning and hot-water supplying system of the kind described above in which the weight of and installation space for heat exchangers can be reduced as much as possible, and which is simple in construction and low in manufacturing and running costs.

In order to achieve the above object, according to one aspect of the present invention, there is provided an air-conditioning and hot-water supplying system which comprises:

a heat pump circuit adapted to circulate a heat-transmitting medium for air-conditioning the interior of a housing, the heat pump circuit including a prime mover, a compressor adapted to be driven by the prime mover, an indoor heat exchanger connected to one side of the compressor and disposed in the housing for heating or cooling air in the housing, an outdoor heat exchanger connected to the other side of the compressor and disposed outside the housing for radiating heat toward or absorbing heat from outside air, the indoor and outdoor heat exchangers being connected with each other through a receiver and a throttling means;

a prime mover cooling circuit adapted to circulate cooling water for cooling the prime mover;

a hot-water circulation circuit including a hot water tank for storing hot water, and a pump for circulating water to be stored in the hot water tank;

a heat-pump water-heating circuit connected to the heat pump circuit in parallel relation with the indoor heat exchanger in the heat pump circuit for heating the water in the hot-water circulation circuit by means of the heat-transmitting medium in the heat pump circuit;

a heat-transmitting-medium heating circuit connected to the heat pump circuit in parallel relation with the outdoor heater for heating the heat-transmitting medium circulating through the heat pump circuit;

a first water-heating heat exchanger disposed in the prime mover cooling circuit, in the heat-transmitting-medium heating circuit and in the hot-water circulation circuit for exchanging heat between the cooling water in the prime mover cooling circuit and the heat-transmitting medium in the heat-transmitting-medium heating circuit, and between the cooling water and the water in the hot-water circulation circuit;

a second water-heating heat exchanger disposed in the heat-pump water-heating circuit and in the hot-water circulation circuit for exchanging heat between the heat-transmitting medium in the heat-pump water-heating circuit and the water in the hot-water circulation circuit; and change-over means for selectively connecting one of the indoor heat exchanger and the heat-pump water-heating circuit with the compressor.

According to another aspect of the present invention, there is provided an air-conditioning and hot-water supplying system which comprises:

a heat pump circuit adapted to circulate a heat-transmitting medium for air-conditioning the interior of a housing, the heat pump circuit including a prime mover, a compressor adapted to be driven by the prime mover, an indoor heat exchanger connected to one side of the compressor and disposed in the housing for heating or cooling air in the housing, an outdoor heat exchanger connected to the other side of the compressor and disposed outside the housing for radiating heat toward or absorbing heat from outside air, the indoor and outdoor heat exchangers being connected with each other through a receiver and a throttling means;

a prime mover cooling circuit adapted to circulate cooling water for cooling the prime mover;

a hot-water circulation circuit including a hot water tank for storing hot water, and a pump for circulating water to be stored in the hot water tank;

a heat-pump water-heating circuit connected to the heat pump circuit in parallel relation with the indoor heat exchanger in the heat pump circuit for heating the water in the hot-water circulation circuit by means of the heat-transmitting medium in the heat pump circuit;

a heat-transmitting-medium heating circuit connected to the heat pump circuit in parallel relation with the outdoor heater for heating the heat-transmitting medium circulating through the heat pump circuit;

a single water-heating heat exchanger disposed in the prime mover cooling circuit, in the heat-transmitting-medium heating circuit, in the hot-water circulation circuit and in the heat-pump water-heating circuit for exchanging heat between the cooling water in the prime mover cooling circuit and the heat-transmitting medium in the heat-transmitting-medium heating circuit, and between the cooling water and the water in the hot-water circulation circuit, and between the heat-transmitting medium in the heat-pump water-heating circuit and the water in the hot-water circulation circuit; and change-over means for selectively connecting one of the indoor heat exchanger and the heat-pump water-heating circuit with the compressor.

The above and other objects, features and advantages of the present invention will become apparent from the following detailed description of several presently preferred embodiments of the invention when taken in conjunction with the accompanying drawings.

DESCRIPTION OF THE PREFERRED EMBODIMENTS

Figure 1:
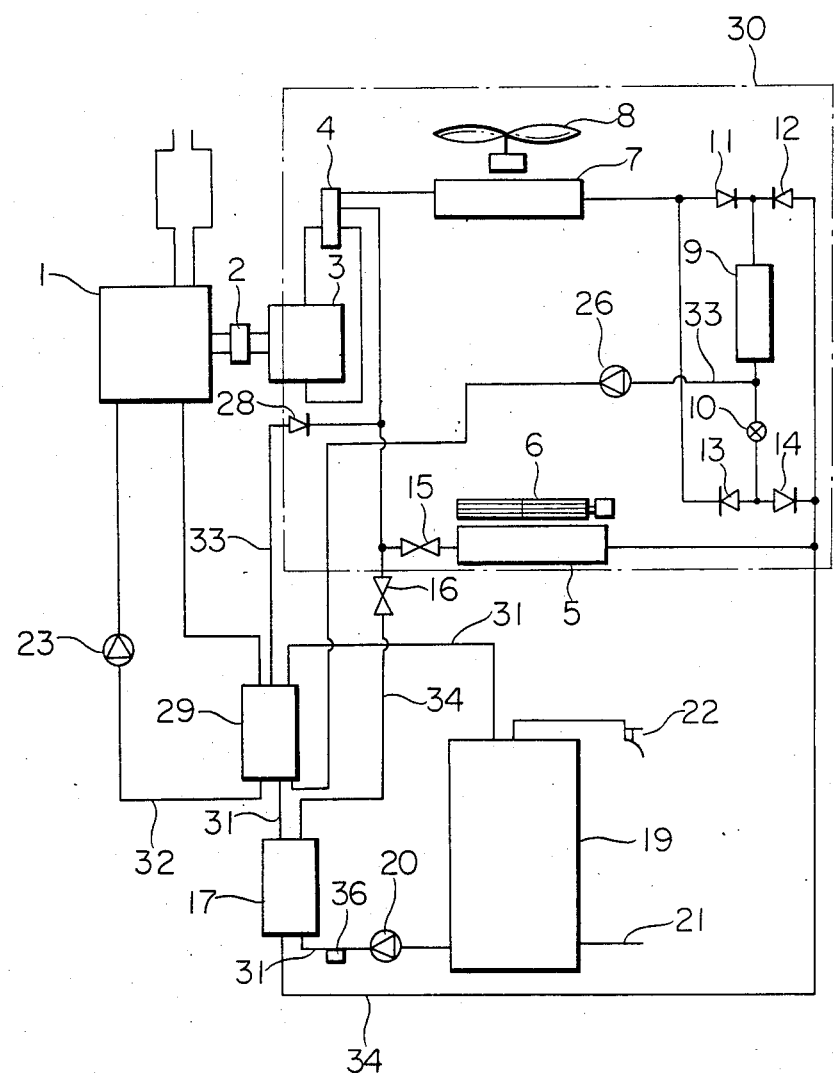
FIG. 1 is a circuit diagram of an air-conditioning and hot-water supplying system in accordance with a first embodiment of the present inventionn.

Now, the present invention will be described in detail with reference to several preferred embodiments thereof as illustrated in the accompanying drawings. In the following description, the same or corresponding parts of the embodiments are identified by the same reference numerals and characters as employed in the conventional system illustrated in FIG. 9.

Figure 2:
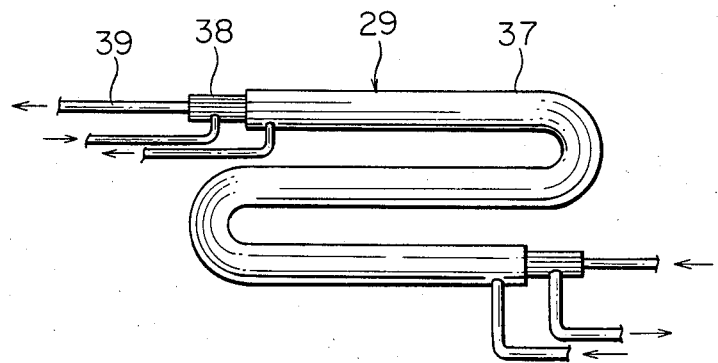
FIG. 2 is a front elevational view of a novel heat exchanger shown in FIG. 1.
Figure 3:
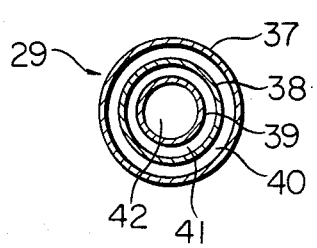
FIG. 3 is an enlarged cross sectional view of a portion of the heat exchanger illustrated in FIG. 2.

FIGS. 1 through 3 show an air-conditioning and hot-water supplying system constructed in accordance with a first embodiment of the present invention. The air-conditioning and hot-water supplying system illustrated in FIG. 1 is substantially similar in construction to the conventional system illustrated in FIG. 9 except for the following features.

Specifically, the air-conditioning and hot-water supplying system of the invention includes a novel heat exchanger 29 disposed in a prime mover cooling circuit 32, in a water heating circuit 31, and in a heat-transmitting-medium heating circuit 33 for exchanging heat between the cooling water circulating through the prime mover cooling circuit 32, the water circulating through the hot-water circulation circuit 31, and the heat-transmitting medium circulating through the heat-transmitting medium heating circuit 33. Thus, in this embodiment, the heat exchanger 29 performs the dual function of heating water in the hot-water heating circuit 31 and of heating the heat-transmitting medium in the heat-transmitting-medium heating circuit 33 by utilizing the waste heat generated in the prime mover 1. A temperature sensor 36 such as a thermosensitive switch is provided at a location near an inlet side of the heat exchanger 17 in the hot-water circulation circuit 31 for detecting the temperature of the water circulating through the hot-water circulation circuit 31. The sensor 36 may be mounted on the hot water tank 19 at its lower portion for the same purpose.

Figure 9:
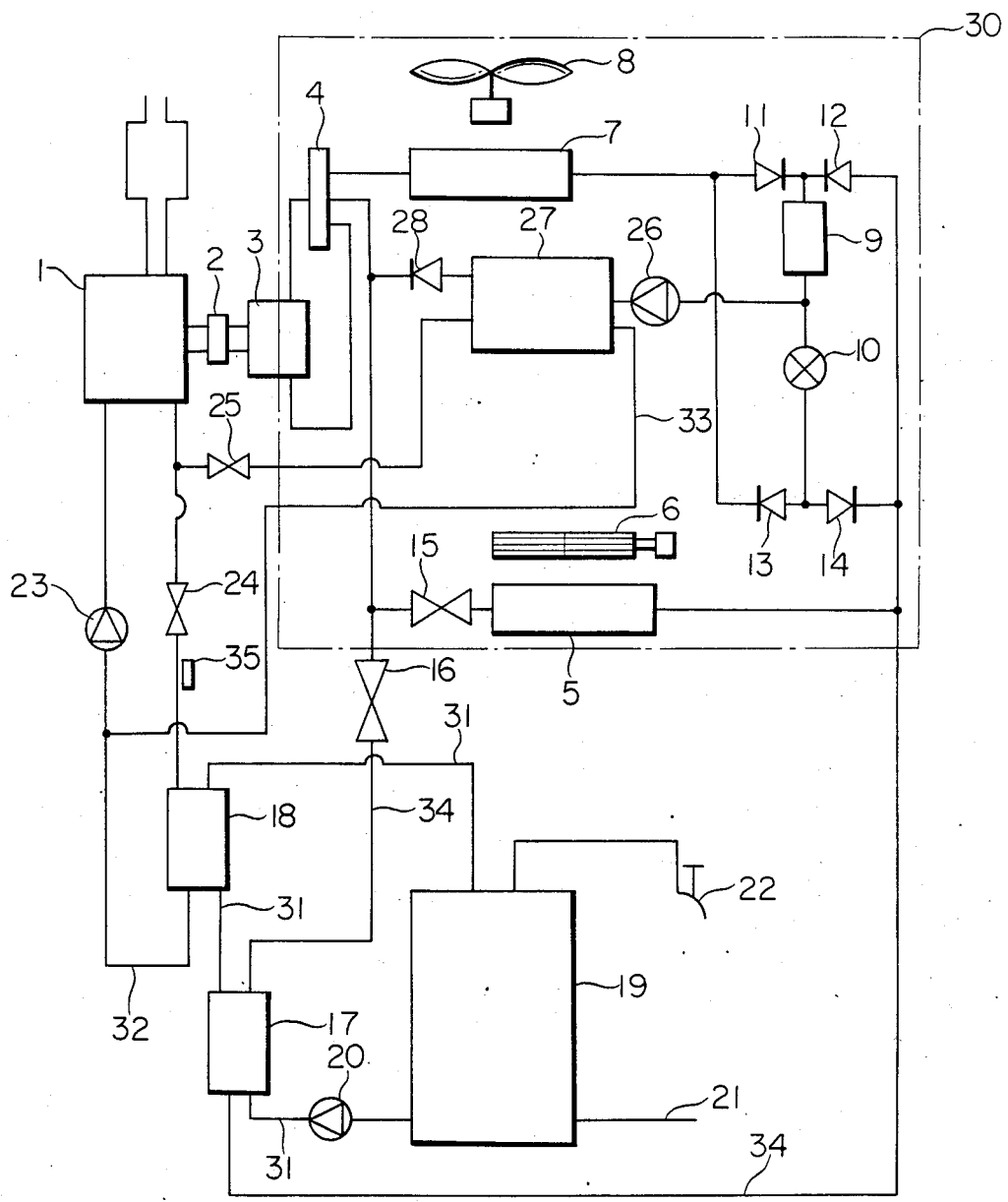
FIG. 9 is a circuit diagram of a conventional air-conditioning and hot-water supplying system.

With the above air-conditioning and hot-water supplying system of this embodiment, the normal air-heating and cooling operation modes as well as the normal water-heating operation mode of the system are carried out in the same manner as in the conventional system illustrated in FIG. 9. Specifically, in these operation modes, water in the hot-water circulation circuit 31 flows from a hot water tank 19 through a pump 20, heat exchangers 17 and 29, and returns to the hot water tank 19.

Also, cooling water in the prime mover cooling circuit 32 successively circulates through the cooling water pump 23, the water jacket (not shown) in the prime mover 1 and the heat exchanger 29. In this connection, it is to be noted that in the prime mover cooling circuit 32 there are no change-over valves such as those designated by reference numeral 24 and 25 (see FIG. 9) and conventionally employed for changing the operation of the system between a water heating operation mode for heating water in the hot-water circulation circuit 31 and a heat-transmitting-medium heating operation mode for heating the heat-transmitting-medium in the heat-transmitting-medium heating circuit 33, and that during operation of the prime mover 1, cooling water always circulates through the heat exchanger 29 so that the waste heat generated in the prime mover 1 is transferred by the heat exchanger 29 to the water in the hot-water circulation circuit 31 and thus stored in the hot water tank 19.

In the normal heat-transmitting-medium heating operation, the pump 26 in the heat-transmitting-medium heating circuit 33 is driven to run so that a part of the liquid heat-transmitting medium condensed by the indoor heat exchanger 5 is branched at a location between a receiver 9 and an expansion valve 10 and fed to the heat exchanger 29 of the invention where the heat-transmitting medium is heated by the cooling water which is heated by the waste heat generated in the prime mover 1 and which passes through the heat exchanger 29. The heat-transmitting medium thus heated vaporizes into gas and passes through a check valve 28 to merge with the heat-transmitting medium from a four-way directional control valve 4, thereby circulating through the heat pump circuit 30. As a result, the heating capacity of the system substantially increases.

According to the present invention, the heat exchanger 29 is constructed as follows. As clearly illustrated in FIGS. 2 and 3, the heat exchanger 29 comprises a triple pipe including an outer pipe 37 bent in a snake-like manner, a first heat transfer pipe 38 disposed in the outer pipe 37, and a second heat transfer pipe 39 disposed in the first heat transfer pipe 38, these pipes 37, 38 and 39 being arranged in a concentric relation with each other. The outer pipe 37 is shorter than the first heat transfer pipe 38 which is in turn shorter than the second heat transfer pipe 39. The outer pipe 37 and the first heat transfer pipe 38 are closed at their opposite ends and have small connector pipes extending from the respective cylindrical side walls of these pipes 37 and 38 at their opposite ends. A first annular flow passage 40 for hot water in the hot-water circulation circuit 31 is formed between the outer pipe 37 and the first heat transfer pipe 38, and a second annular flow passage 41 for the cooling water in the prime mover cooling circuit 32 is formed between the first intermediate heat transfer pipe 38 and the innermost second heat transfer pipe 39, and a third flow passage 42 for heat-transmitting medium in the heat-transmitting-medium heating circuit 33 is formed inside the innermost second heat transfer pipe 39.

With the above-described triple pipe construction of the heat exchanger 29 of the present invention, heat is transferred between the cooling water in the prime mover cooling circuit 32 flowing through the second annular flow passage 41 and the water in the hot-water circulation circuit 31 flowing through the first annular flow passage 40, and between the cooling water in the prime mover cooling circuit 32 flowing through the second annular flow passage 41 and the heat-transmitting medium in the heat-transmitting-medium heating circuit 33 flowing through the third flow passage 42. Thus, the cooling water in the second flow passage 41 serves to heat both the water in the first flow passage 40 and the heat-transmitting medium in the third flow passage 42.

As indicated by arrows in FIG. 2, the cooling water in the second flow passage 41 flows in a direction opposite to that in which the water in the first flow passage 40 and the heat-transmitting medium in the third flow passage 42 flow.

When the prime mover 1 is in operation, cooling water is forced to circulate through the prime mover cooling circuit 32 under the action of the cooling water pump 23. In this state, when the air-conditioning and hot-water supplying system is in the normal cooling operation mode or the heat-pump water-heating operation mode, the heat-transmitting medium pump 26 is not operated, and therefore there is no flow of heat-transmitting medium in the second heat transfer pipe 39, as a consequence of which heat is exchanged only between the cooling water circulating through the prime mover cooling circuit 32 and the water circulating through the hot-water circulation circuit 31 so that the water in the hot-water circulation circuit 31 is thus heated by the prime mover cooling water and stored in the hot water tank 19.

On the other hand, when the system is put into the heat-transmitting-medium heating operation during the air-heating operation thereof, the heat-transmitting-medium heating pump 26 is driven to run so that the heat-transmitting medium is forced to flow through the third flow passage 42 in the second heat transfer pipe 39. Accordingly, in this case, heat is exchanged between the cooling water circulating through the prime mover cooling circuit 32 and the water circulating through the hot-water circulation circuit 31, and between the cooling water and the heat-transmitting medium circulating through the heat-transmitting-medium heating circuit 33 so that the cooling water heated by waste heat generated in the prime mover 1 acts to heat both the water in the hot-water circulation circuit 31 and the heat-transmitting medium.

Figure 4:
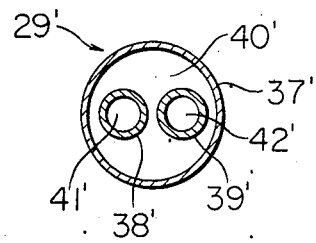
FIG. 4 is a view similar to FIG. 3, showing another heat exchanger according to the present invention.

FIG. 4 shows a modified form of a heat exchanger 29' in accordance with the present invention. In this modification, the heat exchanger 29' comprises an outer pipe 37' having a first flow passage 40' defined therein in which the cooling water in the prime mover cooling circuit 32 flows, and a first and a second heat transfer pipe 38', 39' disposed in the outer pipe 37' in a spaced parallel relation with respect to each other, the first heat transfer pipe 38' having a second flow passage 41' defined therein in which the heat-transmitting medium in the heat-transmitting-medium heating circuit 33 flows, the second heat transfer pipe 39' having a third flow passage 42' defined therein in which the water in the hot-water circulation circuit 31 flows. In this case, similar to the first mentioned embodiment, the cooling water in the first flow passage 40' flows in the direction opposite that in which the heat-transmitting medium in the second flow passage 41' and the water in the third flow passage 42' flow, and heat is exchanged simultaneously between the cooling water in the first flow passage 40' and the heat-transmitting medium in the second flow passage 41', and between the cooling water in the first flow passage 40' and the water in the third flow passage 42'. With this arrangement, the same operation and effects are obtained as in the first mentioned embodiment as illustrated in FIGS. 2 and 3.

In addition, with this modification, if the first flow passage 40' in the outer pipe 37' is connected with the hot-water circulation circuit 31 so that water circulating through the hot-water circulation circuit 31 flows through the first flow passage 40', heat loss due to radiation from the outer surface of the outer pipe 37' can be minimized since the temperature of the water in the water heating circuit is the lowest of the fluids flowing through the heat exchanger 29'. This serves to improve the operation efficiency of the entire system.

Figure 5:
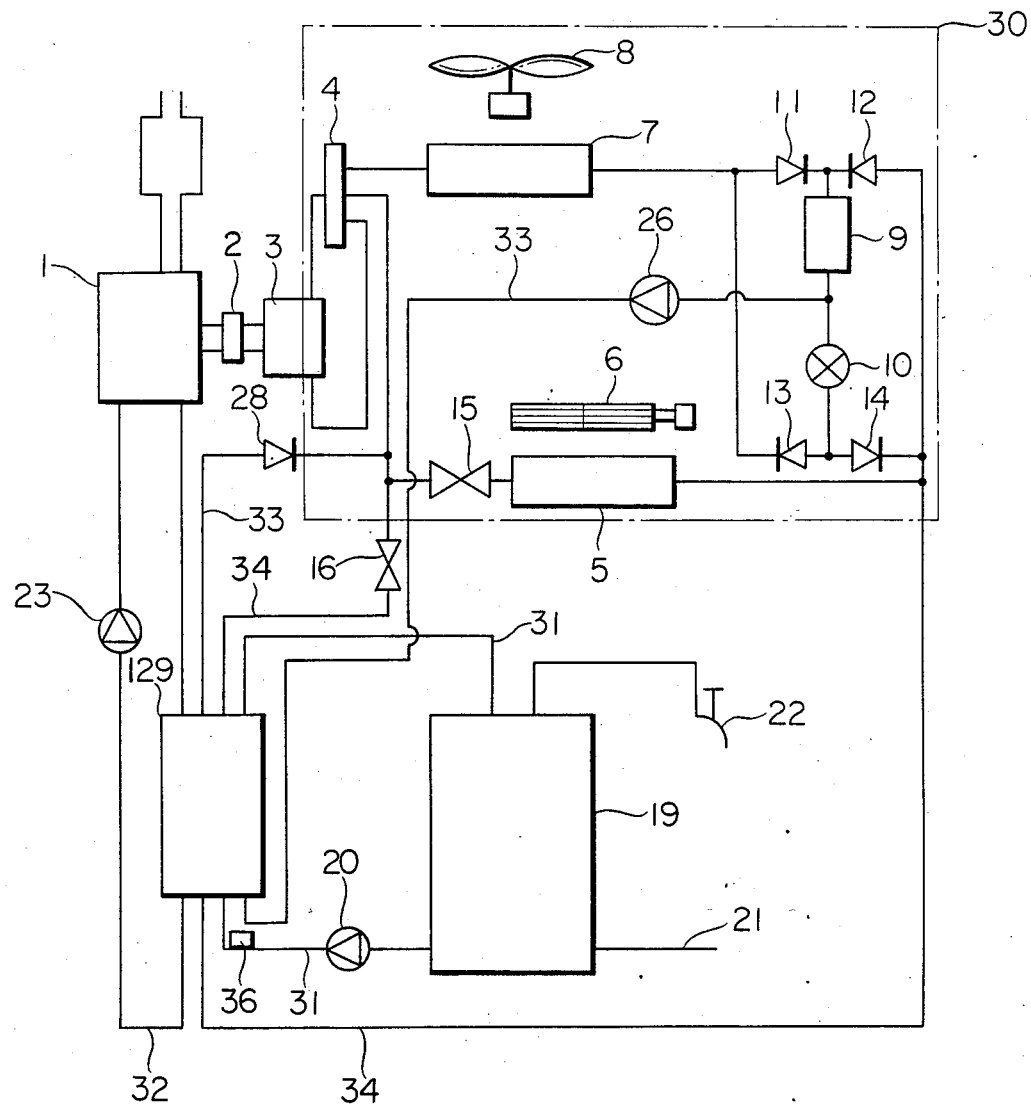
FIG. 5 is a circuit diagram of an air-conditioning and hot-water supplying system in accordance with a second embodiment of the present invention.
Figure 6:
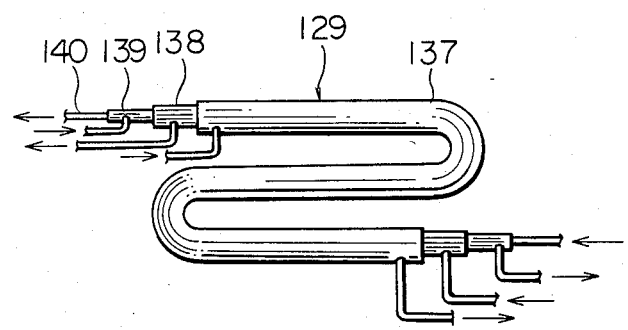
FIG. 6 is a front elevational view of a further novel heat exchanger shown in FIG. 5.
Figure 7:
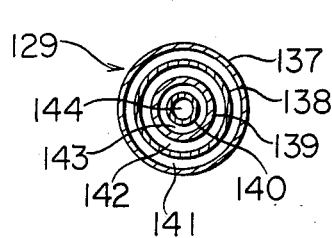
FIG. 7 is an enlarged cross sectional view of a portion of the heat exchanger illustrated in FIG. 6.

FIGS. 5 through 7 show an air-conditioning and hot-water heating system in accordance with another embodiment of the present invention. This embodiment is substantially similar in construction to the above-mentioned first embodiment illustrated in FIG. 1 excepting the following features. Specifically, this embodiment employs a single heat exchanger 129 in place of the heat exchangers 17 and 29 of the first embodiment illustrated in FIGS. 1 through 3. As seen from FIGS. 6 and 7, the heat exchanger 129 of this embodiment is disposed in a prime-mover cooling circuit 32, in a hot-water circulation circuit 31, in a heat-transmitting-medium heating circuit 33, and in a heat-pump water-heating circuit 34 for exchanging heat between the cooling water circulating through the prime-mover cooling circuit 32 and the water circulating through the hot-water circulation circuit 31, and between the cooling water and the heat-transmitting medium circulating through the heat-transmitting-medium heating circuit 33, and between the heat-transmitting medium circulating through the heat-pump water-heating circuit 34 and the water circulating through the hot-water circulation circuit 31. Thus, in this embodiment, the heat exchanger 129 performs the functions of heating the water in the hot-water circulation circuit 31 and the heat-transmitting medium in the heat-transmitting-medium heating circuit 33 by utilizing the waste heat generated in the prime mover 1, as well as the function of heating the water in the hot-water circulation circuit 33 by utilizing the heat pump operation.

With the above air-conditioning and hot-water supplying system of this embodiment, the normal air-conditioning operation as well as the normal water-heating operation of the system are carried out in the same manner as in the first embodiment illustrated in FIGS. 1 through 3.

According to the this embodiment, the heat exchanger 129 is constructed as follows. As illustrated in FIGS. 6 and 7, the heat exchanger 129 comprises a quadruple pipe including an outer pipe 137 bent in a snake-like manner, a first heat transfer pipe 138 disposed in the outer pipe 137, a second heat transfer pipe 139 disposed in the first heat transfer pipe 138, and a third heat transfer pipe 140 disposed in the second heat transfer pipe 138, these pipes 137, 138, 139 and 140 being arranged in a concentric relation with each other. The outer pipe 137 is shorter than the first heat transfer pipe 138 which is in turn shorter than the second heat transfer pipe 139 which is in turn shorter than the third heat transfer pipe 140. The outer pipe 137, the first heat transfer pipe 138, and the second heat transfer pipe 139 are closed at their opposite ends with small connector pipes extending from the respective cylindrical side walls of these pipes 137, 138 and 139 at their opposite ends. A first annular flow passage 141 for heat-transmitting medium in the heat-pump water-heating circuit is formed between the outer pipe 137 and the first heat transfer pipe 138, and a second annular flow passage 142 for hot water in the hot-water circulation circuit 31 is formed between the first heat transfer pipe 138 and the second heat transfer pipe 139, and a third flow passage 143 for cooling water in the prime mover cooling circuit 32 is formed between the second heat transfer pipe 139 and the third heat transfer pipe 140, and a fourth flow passage 144 for heat-transmitting medium in the heat-transmitting-medium heating circuit 33 is formed inside the innermost third heat transfer pipe 140.

With the above-described quadruple pipe construction of the heat exchanger 129, heat is transferred between the cooling water in the prime mover cooling circuit 32 flowing through the third annular flow passage 143 and the water in the hot-water circulation circuit 31 flowing through the second annular flow passage 142, and between the cooling water in the prime mover cooling circuit 32 flowing through the third annular flow passage 143 and the heat-transmitting medium in the heat-transmitting-medium heating circuit 33 flowing through the fourth flow passage 144, and between the heat-transmitting medium in the heat-pump water-heating circuit 34 flowing through the first annular flow passage 141 and the hot-water in the hot-water circulation circuit 31 flowing through the second annular flow passage 142. Thus, the cooling water in the third flow passage 143 serves to heat both the water in the second flow passage 142 and the heat-transmitting medium in the fourth flow passage 144, whereas the heat-transmitting medium in the first flow passage 141 serves to heat the water in the second flow passage 142.

As indicated by arrows in FIG. 6, the heat-transmitting medium in the first flow passage 141 and the cooling water in the third flow passage 143 flow in the direction opposite to that in which the hot water in the second flow passage 142 and the heat-transmitting medium in the fourth flow passage 144 flow.

When the prime mover 1 is in operation, cooling water is forced to circulate through the prime mover cooling circuit 32 under the action of the cooling water pump 23. In this state, when the air-conditioning and hot-water supplying system is in the normal cooling operation mode or the heat-pump water-heating operation mode, the heat-transmitting medium pump 26 is not operated and therefore there is no flow of heat-transmitting medium in the third heat transfer pipe 140, as a consequence of which heat is exchanged only between the cooling water circulating through the prime mover cooling circuit 32 and the water circulating through the hot-water circulation circuit 31 so that the water passing through the second flow passage 142 in the first heat transfer pipe 138 is heated by the prime mover cooling water passing through the third flow passage 143 in the second heat transfer pipe 139 and stored in the hot water tank 19.

On the other hand, when the system is in the heat-transmitting-medium heating operating during the air-heating operation thereof, the heat-transmitting-medium heating pump 26 is driven to run so that the heat-transmitting medium is forced to flow through the third heat transfer pipe 140. Accordingly, in this case, heat is exchanged between the cooling water circulating through the prime mover cooling circuit 32 and the water circulating through the hot-water circulation circuit 31, and between the cooling water and the heat-transmitting medium passing through the heat-transmitting-medium heating circuit 33 so that the cooling water acts to heat both the water in the hot-water circulation circuit 31 and the heat-transmitting medium in the heat-transmitting-medium heating circuit 33.

Moreover, in the heat-pump water-heating operation of the system, the heat-transmitting medium of high temperatures circulating through the heat-pump water-heating circuit 34 flows through the first flow passage 141 in the outer pipe 137 so that the water passing through the second flow passage 142 in the first heat transfer pipe 138 is heated by the prime mover cooling water flowing through the third flow passage 143 and the heat-transmitting medium of high temperatures in the first flow passage 141.

Figure 8:
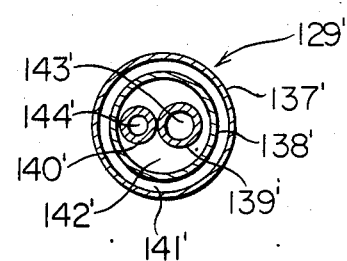
FIG. 8 is a view similar to FIG. 7, showing a still further heat exchanger according to the present invention.

FIG. 8 shows a modified form of a heat exchanger 129' in accordance with the present invention. In this modification, the heat exchanger 129' comprises an outer pipe 137' having a first flow passage 141' defined therein in which the heat-transmitting medium in the heat-pump water-heating circuit 34 flows, a first heat transfer pipe 138' disposed in the outer pipe 137' and having a second flow passage 142' defined therein in which the hot water in the hot-water circulation circuit 31 flows, and a second and a third heat transfer pipe 139', 140' disposed in the first heat transfer pipe 138' in a contacted parallel relation with each other, the second heat transfer pipe 139' having a third flow passage 143' defined therein in which the cooling water in the prime mover cooling circuit 32 flows, the third heat transfer pipe 140' having a fourth flow passage 144' defined therein in which heat-transmitting medium in the heat-transmitting-medium heating circuit 33 flows. In this case, similar to the embodiment illustrated in FIGS. 5 through 7, the cooling water in the third flow passage 143' in the second heat transfer pipe 139' flows in the direction opposite to that in which the heat-transmitting medium in the fourth flow passage 144' in the third heat transfer pipe 140' and the hot water in the second flow passage 142' in the first heat transfer pipe 138' flow, and the hot water in the second flow passage 142' flows in the direction opposite to that in which the heat-transmitting medium in the first flow passage 141' in the outer pipe 137' flows.

In this connection, it is necessary to place the second and third heat transfer pipes 139' and 140' in intimate contact with each other in order to exchange heat between the cooling water in the prime mover cooling circuit 32 and the heat-transmitting medium in the heat-transmitting-medium heating circuit 33 in an effective manner during the time when the heat-transmitting medium is heated. Therefore, it is preferable that the second and third heat transfer pipes 139' and 140' be joined with each other at their outer peripheral surfaces or integrally formed with each other. Further, in cases where the hot water in the hot-water circulation circuit 31 is higher in temperature than the heat-transmitting medium in the heat-transmitting-medium heating circuit 33, it is possible to heat the heat-transmitting medium by means of the hot water, thereby improving the air-heating capability of the entire system. On the other hand, if the hot water in the hot-water circulation circuit 31 is low in temperature and can not be utilized as a heating source and the amount of heat of the prime mover cooling water required for heating the heat-transmitting medium is large, the air-heating capacity of the system is not increased so much and hence in this case, it is possible to control the operation of the pump 20 by means of the thermosensitive switch 36 so that circulation of the hot water through the hot-water circulation circuit 31 is stopped, thereby substantially increasing the air-heating capacity. With this arrangement, the same operation and effects are obtained as in the embodiment illustrated in FIGS. 6 and 7.

In the above-described embodiments, the inside diameter of each of the pipes 37, 37', 38, 38', 39, 39' 137, 137', 138, 138', 139, 139', 140 and 140' of the heat exchangers 29, 29', 129 and 129' can be appropriately selected and determined in accordance with the flow rate, the velocity of flow, and the heat transfer characteristic of the fluids flowing therethrough, and also the respective pipes may be provided on their inner surfaces with fins, grooves or the like for regulating the flow of fluid passing therethrough in an appropriate manner.

Although in FIGS. 2 or 6, the respective pipes 37, 38 and 39 or 137, 138, 139 and 140 are curved in a snake-like manner, they may be formed in a coil-like configuration.

As will be clear from the foregoing description, the present invention provides the following advantages. Specifically, a single heat exchanger is employed for heating water circulating through a hot-water circulation circuit and heat-transmitting medium flowing through a heat-transmitting-medium heating circuit by utilization of the waste heat generated in a prime mover, and therefore there is no need for employing two separate heat exchangers, one for heating the heat-transmitting medium flowing through a heat-transmitting-medium heating circuit and the other for heating the water circulating through a hot-water circulation circuit, both of which are arranged in parallel relation with each other with change-over means such as electromagnetic change-over valves being provided for selectively changing over the connection of these parallel heat exchangers with the prime mover cooling circuit in accordance with the operating modes of the air-conditioning and hot-water supplying system, as required in the conventional system illustrated in FIG. 9. Thus, the above-mentioned conventionally employed changer-over means are also unnecessary, and the installation space for the heat exchangers can be materially reduced, thereby minimizing the dimensions of an oudoor unit including the above-described heat exchanger disposed outdoors. As a result, the system as a whole can be reduced in weight and simplified in construction and arrangement, thus contributing to reduction in manufacturing costs.

What is claimed is:

1. An air-conditioning and hot-water supplying system comprising:

a heat pump circuit adapted to circulate heat-transmitting medium for air-conditioning the interior of a housing, said heat pump circuit including a prime mover, a compressor adapted to be driven by said prime mover, an indoor heat exchanger connected to one side of said compressor and disposed in said housing for heating or cooling air in said housing, an outdoor heat exchanger connected to the other side of said compressor and disposed outside said housing for radiating heat toward or absorbing heat from outside air, said indoor and outdoor heat exchangers being connected with each other through a receiver and a throttling means;

a prime mover cooling circuit adapted to circulate cooling water for cooling said prime mover;

a hot-water circulation circuit including a hot water tank for storing hot water, and a pump for circulating water to be stored in said hot water tank;

a heat-pump water-heating circuit connected to said heat pump circuit in a parallel relation with said indoor heat exchanger in said heat pump circuit for heating the water in said hot-water circulation circuit by means of the heat-transmitting medium in said heat pump circuit;

a heat-transmitting-medium heating circuit connected to said heat pump circuit in a parallel relation with said outdoor heater for heating the heat-transmitting medium circulating through said heat pump circuit;

a first water-heating heat exchanger disposed in said prime mover cooling circuit, in said heat-transmitting-medium heating circuit and in said hot-water circulation circuit for exchanging heat between the cooling water in said prime mover cooling circuit and the heat-transmitting medium in said heat-transmitting-medium heating circuit, and between the cooling water and the water in said hot-water circulation circuit;

a second water-heating heat exchanger disposed in said heat-pump water-heating circuit and in said hot-water circulation circuit for exchanging heat between the heat-transmitting medium in said heat-pump water-heating circuit and the water in said hot-water circulation circuit; and change-over means for selectively connecting one of said indoor heat exchanger and said heat-pump water-heating circuit with said compressor.

2. An air-conditioning and hot-water supplying system as set forth in claim 1, wherein said first water-heating heat exchanger comprises an outer pipe having a first flow passage defined therein in which the heat-transmitting medium in said heat-transmitting-medium heating circuit flows, a first heat transfer pipe disposed in said outer pipe and having a second flow passage defined therein in which the cooling water in said prime mover cooling circuit flows, and a second heat transfer pipe disposed in said first heat transfer pipe and having a third flow passage defined therein in which the water in said hot-water circulation circuit flows.

3. An air-conditioning and hot-water supplying system as set forth in claim 2, wherein the cooling water in said second flow passage flows in the direction opposite that in which the heat-transmitting medium in said first flow passage and the water in said third flow passage flow.

4. An air-conditioning and hot-water supplying system as set forth in claim 1, wherein said first water-heating heat exchanger comprises an outer pipe having a first flow passage defined therein in which the water in said hot-water circulation circuit flows, a first heat transfer pipe disposed in said outer pipe and having a second flow passage defined therein in which the cooling water in said prime mover cooling circuit flows, and a second heat transfer pipe disposed in said first heat transfer pipe and having a third flow passage defined therein in which the heat-transmitting medium in said heat-transmitting-medium heating circuit flows.

5. An air-conditioning and hot-water supplying system as set forth in claim 4, wherein the cooling water in said second flow passage flows in the direction opposite to that in which the heat-transmitting medium in said third flow passage and the water in said first flow passage flow.

6. An air-conditioning and hot-water supplying system as set forth in claim 1, wherein said first water-heating heat exchanger comprises an outer pipe having a first flow passage defined therein in which the cooling water in said prime mover cooling circuit flows, a first heat transfer pipe disposed in said outer pipe and having a second flow passage defined therein in which the heat-transmitting medium in said heat-transmitting-medium heating circuit flows, and a second heat transfer pipe disposed in said outer pipe in a side-by-side relation with said first heat transfer pipe and having a third flow passage defined therein in which the water in said hot-water circulation circuit flows.

7. An air-conditioning and hot-water supplying system as set forth in claim 6, wherein the cooling water in said first flow passage flows in the direction opposite to that in which the heat-transmitting medium in said second flow passage and the water in said third flow passage flow.

8. An air-conditioning and hot-water supplying system as set forth in claim 1, further comprising a four-way directional control valve connected to an inlet side and an outlet side of said compressor and to said indoor and outdoor heat exchangers, wherein said heat-transmitting-medium heating circuit is connected to said heat pump circuit at locations between said receiver and said throttling means and between said four-way directional control valve and said indoor heat exchanger.

9. An air-conditioning and hot-water supplying system as set forth in claim 8, wherein said change-over means comprises a first change-over valve disposed in said heat pump circuit at a location between said four-way directional control valve and said indoor heat exchanger, and a second change-over valve disposed in said heat-pump water-heating circuit at a location between said four-way directional control valve and said second water-heating heat exchanger.

10. An air-conditioning and hot-water supplying system comprising:
a heat pump circuit adapted to circulate heat-transmitting medium for air-conditioning the interior of a housing, said heat pump circuit including a prime mover, a compressor adapted to be driven by said prime mover, an indoor heat exchanger connected to one side of said compressor and disposed in said housing for heating or cooling air in said housing, an outdoor heat exchanger connected to the other side of said compressor and disposed outside said housing for radiating heat toward or absorbing heat from outside air, said indoor and outdoor heat exchangers being connected with each other through a receiver and a throttling means;
a prime mover cooling circuit adapted to circulate cooling water for cooling said prime mover;
a hot-water circulation circuit including a hot water tank for storing hot water, and a pump for circulating water to be stored in said hot water tank;
a heat-pump water-heating circuit connected to said heat pump circuit in parallel relation with said indoor heat exchanger in said heat pump circuit for heating the water in said hot-water circulation circuit by means of the heat-transmitting medium in said heat pump circuit;
a heat-transmitting-medium heating circuit connected to said heat pump circuit in parallel relation with said outdoor heater for heating the heat-transmitting medium circulating through said heat pump circuit;
a single water-heating heat exchanger disposed in said prime mover cooling circuit, in said heat-transmitting-medium heating circuit, in said hot-water circulation circuit and in said heat-pump water-heating circuit for exchanging heat between the cooling water in said prime mover cooling circuit and the heat-transmitting medium in said heat-transmitting-medium heating circuit, and between the cooling water and the water in said hot-water circulation circuit, and between the heat-transmitting medium in said heat-pump water-heating circuit and the water in said hot-water circulation circuit; and
change-over means for selectively connecting one of said indoor heat exchanger and said heat-pump water-heating circuit with said compressor.

11. An air-conditioning and hot-water supplying system as set forth in claim 10, wherein said single water-heating heat exchanger comprises an outer pipe having a first flow passage defined therein in which the heat-transmitting medium in said heat-transmitting-medium heating circuit flows, a first heat transfer pipe disposed in said outer pipe and having a second flow passage defined therein in which the water in said hot-water circulation circuit flows, a second heat transfer pipe disposed in said first heat transfer pipe and having a third flow passage defined therein in which the cooling water in said prime mover cooling circuit flows, and a third heat transfer pipe disposed in said second heat transfer pipe and having a fourth flow passage defined therein in which the heat-transmitting medium in said heat-pump water-heating circuit flows.

12. An air-conditioning and hot-water supplying system as set forth in claim 11, wherein the water in said second flow passage flows in the direction opposite to that in which the heat-transmitting medium in said first flow passage and the cooling water in said third flow passage flow, and wherein the cooling water in said third flow passage flows in the direction opposite to that in which the heat-transmitting medium in said fourth flow passage flows.

13. An air-conditioning and hot-water supplying system as set forth in claim 10, wherein said single water-heating heat exchanger comprises an outer pipe having a first flow passage defined therein in which the heat-transmitting medium in said heat-transmitting-medium heating circuit flows, a first heat transfer pipe disposed in said outer pipe and having a second flow passage defined therein in which the water in said hot-water circulation circuit flows, a second heat transfer pipe disposed in said first heat transfer pipe and having a third flow passage defined therein in which the cooling water in said prime mover cooling circuit flows, and a third heat transfer pipe disposed in said first heat transfer pipe in a contacted parallel relation with said second heat transfer pipe and having a fourth flow passage defined therein in which the heat-transmitting medium in said heat-pump water-heating circuit flows.

14. An air-conditioning and hot-water supplying system as set forth in claim 13, wherein the water in said second flow passage flows in the direction opposite to that in which the heat-transmitting medium in said first flow passage and the cooling water in said third flow passage flows, and wherein the cooling water in said third flow passage flows in the direction opposite to that in which the heat-transmitting medium in said fourth flow passage flows.

15. An air-conditioning and hot-water supplying system as set forth in claim 10, further comprising a four-way directional control valve connected to an inlet side and an outlet side of said compressor and to said indoor and outdoor heat exchangers, wherein said heat-transmitting-medium heating circuit is connected to said heat pump circuit at locations between said receiver and said throttling means and between said four-way directional control valve and said indoor heat exchanger.

16. An air-conditioning and hot-water supplying system as set forth in claim 15, wherein said change-over means comprises a first change-over valve disposed in said heat pump circuit at a location between said four-way directional control valve and said indoor heat exchanger, and a second change-over valve disposed in said heat-pump water-heating circuit at a location between said four-way directional control valve and said water-heating heat exchanger.

* * * * *